(12) United States Patent
Postevka

(10) Patent No.: US 10,012,321 B2
(45) Date of Patent: Jul. 3, 2018

(54) CYLINDRICAL VALVE ASSEMBLY

(71) Applicant: Valentin Postevka, Gilbert, AZ (US)

(72) Inventor: Valentin Postevka, Gilbert, AZ (US)

( * ) Notice: Subject to any disclaimer, the term of this patent is extended or adjusted under 35 U.S.C. 154(b) by 6 days.

(21) Appl. No.: 14/331,733

(22) Filed: Jul. 15, 2014

(65) Prior Publication Data

US 2015/0021507 A1 Jan. 22, 2015

Related U.S. Application Data

(60) Provisional application No. 61/847,595, filed on Jul. 18, 2013.

(51) Int. Cl.
*F16K 13/02* (2006.01)
*F02D 9/16* (2006.01)
*F16K 5/04* (2006.01)

(52) U.S. Cl.
CPC .............. *F16K 13/02* (2013.01); *F02D 9/16* (2013.01); *F16K 5/0421* (2013.01)

(58) Field of Classification Search
CPC ....... F16K 13/02; F16K 5/0421; F16K 5/0221
USPC .......................................................... 251/304
See application file for complete search history.

(56) References Cited

U.S. PATENT DOCUMENTS

| | | | | |
|---|---|---|---|---|
| 1,163,223 A | * | 12/1915 | Deppe .................... | F02M 7/133 251/304 |
| 1,532,251 A | * | 4/1925 | Lorraine ................ | F16K 5/0421 251/192 |
| 1,540,263 A | * | 6/1925 | Heggem ................. | E21B 33/04 137/315.02 |
| 2,025,665 A | * | 12/1935 | Dickinson ............... | F16K 13/02 251/1.1 |
| 2,668,684 A | * | 2/1954 | Metzger .................. | F16K 13/02 220/502 |
| 2,707,488 A | * | 5/1955 | Overdijk .................. | G01F 1/42 138/44 |
| 3,123,334 A | * | 3/1964 | Hitz ....................... | F16K 5/0621 251/147 |
| 3,127,909 A | * | 4/1964 | Alamprese ............ | F16K 5/0421 137/625.31 |

(Continued)

FOREIGN PATENT DOCUMENTS

| | | | |
|---|---|---|---|
| CA | 2308632 A1 | * 4/1999 | .......... F02B 27/0284 |
| DE | 821297 C | * 11/1951 | ............. F16K 13/02 |

(Continued)

OTHER PUBLICATIONS

Nov. 6, 014 International Search Report issued in International Patent Application No. PCT/US2014/046672.

*Primary Examiner* — Marina Tietjen
(74) *Attorney, Agent, or Firm* — Clements Bernard Walker PLLC; Christopher L. Bernard

(57) ABSTRACT

A cylindrical valve assembly, including: a housing defining a fluid flow channel there through; a cylindrical core disposed within the housing and defining a fluid flow channel there through; and at least one cylindrical valve door disposed between the housing and the cylindrical core; wherein, when the at least one cylindrical valve door is actuated, the fluid flow channels through the housing and the cylindrical core are one of opened and closed; and wherein the at least one cylindrical valve door does not protrude into any portion of the interior of the cylindrical core when actuated. Preferably, the at least one cylindrical valve door includes a pair of cylindrical valve doors.

13 Claims, 4 Drawing Sheets

(56) References Cited

U.S. PATENT DOCUMENTS

| | | | | |
|---|---|---|---|---|
| 3,208,719 | A * | 9/1965 | Hulsey | F16K 5/0421 |
| | | | | 137/625.32 |
| 3,916,949 | A * | 11/1975 | Armstrong | B65D 90/582 |
| | | | | 137/869 |
| 5,315,963 | A | 5/1994 | Warf | |
| 5,335,692 | A * | 8/1994 | Hobson | F16K 5/0421 |
| | | | | 137/614.17 |
| 5,618,027 | A * | 4/1997 | Nevrekar | F16K 13/02 |
| | | | | 251/250.5 |
| 6,395,048 | B1 | 5/2002 | Yoder et al. | |
| 7,921,876 | B2 | 4/2011 | Wright et al. | |
| 8,413,954 | B1 * | 4/2013 | Burrow | B65B 39/001 |
| | | | | 251/147 |
| 2005/0121639 | A1 * | 6/2005 | Delzer | F16K 3/22 |
| | | | | 251/300 |
| 2006/0249702 | A1 * | 11/2006 | Besen | C23C 16/44 |
| | | | | 251/208 |
| 2011/0120414 | A1 | 5/2011 | Quantz | |
| 2011/0297861 | A1 * | 12/2011 | Cronin | F16K 13/02 |
| | | | | 251/304 |
| 2012/0104301 | A1 * | 5/2012 | Tuna | F01L 7/02 |
| | | | | 251/304 |
| 2012/0248359 | A1 * | 10/2012 | Dederich | F16K 31/54 |
| | | | | 251/248 |

FOREIGN PATENT DOCUMENTS

| | | | | |
|---|---|---|---|---|
| DE | 2749431 A1 | * | 5/1979 | F16K 3/22 |
| FR | 910335 A | * | 6/1946 | F16K 1/18 |
| FR | 1055606 A | * | 2/1954 | F16K 13/02 |
| FR | 1155574 A | * | 5/1958 | F16K 3/22 |
| FR | 2709329 A1 | * | 3/1995 | F02C 7/232 |
| GB | 772467 A | * | 4/1957 | F16K 5/0421 |
| GB | 870804 A | * | 6/1961 | F16K 13/02 |
| GB | 1464155 A | * | 2/1977 | F16K 5/04 |
| WO | WO 9734097 A1 | * | 9/1997 | F16K 5/0421 |

* cited by examiner

CYLINDRICAL VALVE ASSEMBLY

CROSS-REFERENCE TO RELATED APPLICATION

The present disclosure claims the benefit of priority of U.S. Provisional Patent Application No. 61/847,595, filed on Jul. 18, 2013, and entitled "CYLINDRICAL VALVE ASSEMBLY," the contents of which are incorporated in full by reference herein.

FIELD OF THE DISCLOSURE

The present disclosure relates generally to an improved cylindrical valve assembly. More specifically, the present disclosure relates to an improved cylindrical valve assembly that provides a substantially constant internal geometry and volume upon actuation, such that the internal intake flow is substantially constant and uninterrupted. The improved cylindrical valve assembly of the present disclosure (also variously referred to as a rotary valve, a roller valve, a barrel valve, a butterfly valve, or a throttle body, for example) finds particular applicability in the throttle assembly of an engine, although other applications are contemplated herein.

BACKGROUND OF THE DISCLOSURE

Numerous cylindrical valves, rotary valves, roller valves, barrel valves, butterfly valves, and throttle bodies are known to those of ordinary skill in the art. These valves all suffer from a common shortcoming—when the shutter mechanism is actuated, the internal geometry and volume of the valve assembly is changed and the internal intake flow through the valve housing is undesirably interrupted. In the case of a throttle body, this results in an undesirable interruption in the internal airflow, for example. The result is decreased efficiency and performance. Thus, an improved cylindrical valve is still needed in the art, and is provided by the present disclosure.

BRIEF SUMMARY OF THE DISCLOSURE

In various exemplary embodiments, the present disclosure provides an improved cylindrical valve assembly that maintains a substantially constant internal geometry and volume upon actuation, when the shutter mechanism/valve door(s) is/are opened or closed, such that the internal intake flow is substantially constant and uninterrupted.

In one exemplary embodiment, the present disclosure provides a cylindrical valve assembly, including: a housing providing a fluid flow channel there through; a cylindrical core disposed within the housing and providing a fluid flow channel there through; and a cylindrical valve door disposed between the housing and the cylindrical core; wherein, when the cylindrical valve door is rotatably actuated, the fluid flow channels through the housing and the cylindrical core are one of opened and closed; and wherein the cylindrical valve door does not protrude into any portion of the interior of the cylindrical core when rotatably actuated.

In another exemplary embodiment, the present disclosure provides a throttle body, including: a housing providing an intake flow channel there through; a cylindrical core disposed within the housing and providing an intake flow channel there through; and a cylindrical valve door disposed between the housing and the cylindrical core; wherein, when the cylindrical valve door is rotatably actuated, the intake flow channels through the housing and the cylindrical core are one of opened and closed; and wherein the cylindrical valve door does not protrude into any portion of the interior of the cylindrical core when rotatably actuated.

In a further exemplary embodiment, the present disclosure provides a cylindrical valve assembly, including: a housing defining a fluid flow channel there through; a cylindrical core disposed within the housing and defining a fluid flow channel there through; and at least one cylindrical valve door disposed between the housing and the cylindrical core; wherein, when the at least one cylindrical valve door is actuated, the fluid flow channels through the housing and the cylindrical core are one of opened and closed; and wherein the at least one cylindrical valve door does not protrude into any portion of the interior of the cylindrical core when actuated. Preferably, the at least one cylindrical valve door includes a pair of cylindrical valve doors. The pair of cylindrical valve doors are simultaneously actuated in equal and opposite directions. The pair of cylindrical valve doors are coupled via a gear assembly or the like. The pair of cylindrical valve doors are coupled to and actuated via the rotation of at least one shaft. The pair of cylindrical valve doors are coupled to and actuated by a spring. Optionally, the housing and the cylindrical core are integrally formed.

In a still further exemplary embodiment, the present disclosure provides a throttle body, including: a housing defining a fluid flow channel there through; a cylindrical core disposed within the housing and defining a fluid flow channel there through; and at least one cylindrical valve door disposed between the housing and the cylindrical core; wherein, when the at least one cylindrical valve door is actuated, the fluid flow channels through the housing and the cylindrical core are one of opened and closed; and wherein the at least one cylindrical valve door does not protrude into any portion of the interior of the cylindrical core when actuated. Preferably, the at least one cylindrical valve door includes a pair of cylindrical valve doors. The pair of cylindrical valve doors are simultaneously actuated in equal and opposite directions. The pair of cylindrical valve doors are coupled via a gear assembly or the like. The pair of cylindrical valve doors are coupled to and actuated via the rotation of at least one shaft. The pair of cylindrical valve doors are coupled to and actuated by a spring. Optionally, the housing and the cylindrical core are integrally formed.

BRIEF DESCRIPTION OF THE DRAWINGS

The present disclosure is illustrated and described with reference to the various drawings, in which like reference numbers are used to denote like assembly components/method steps, as appropriate, and in which.

DETAILED DESCRIPTION OF THE DISCLOSURE

Again, in various exemplary embodiments, the present disclosure provides an improved cylindrical valve assembly that maintains a substantially constant internal geometry and volume upon actuation, when the shutter mechanism/valve door is opened or closed, such that the internal intake flow is substantially constant and uninterrupted.

Figure 1:
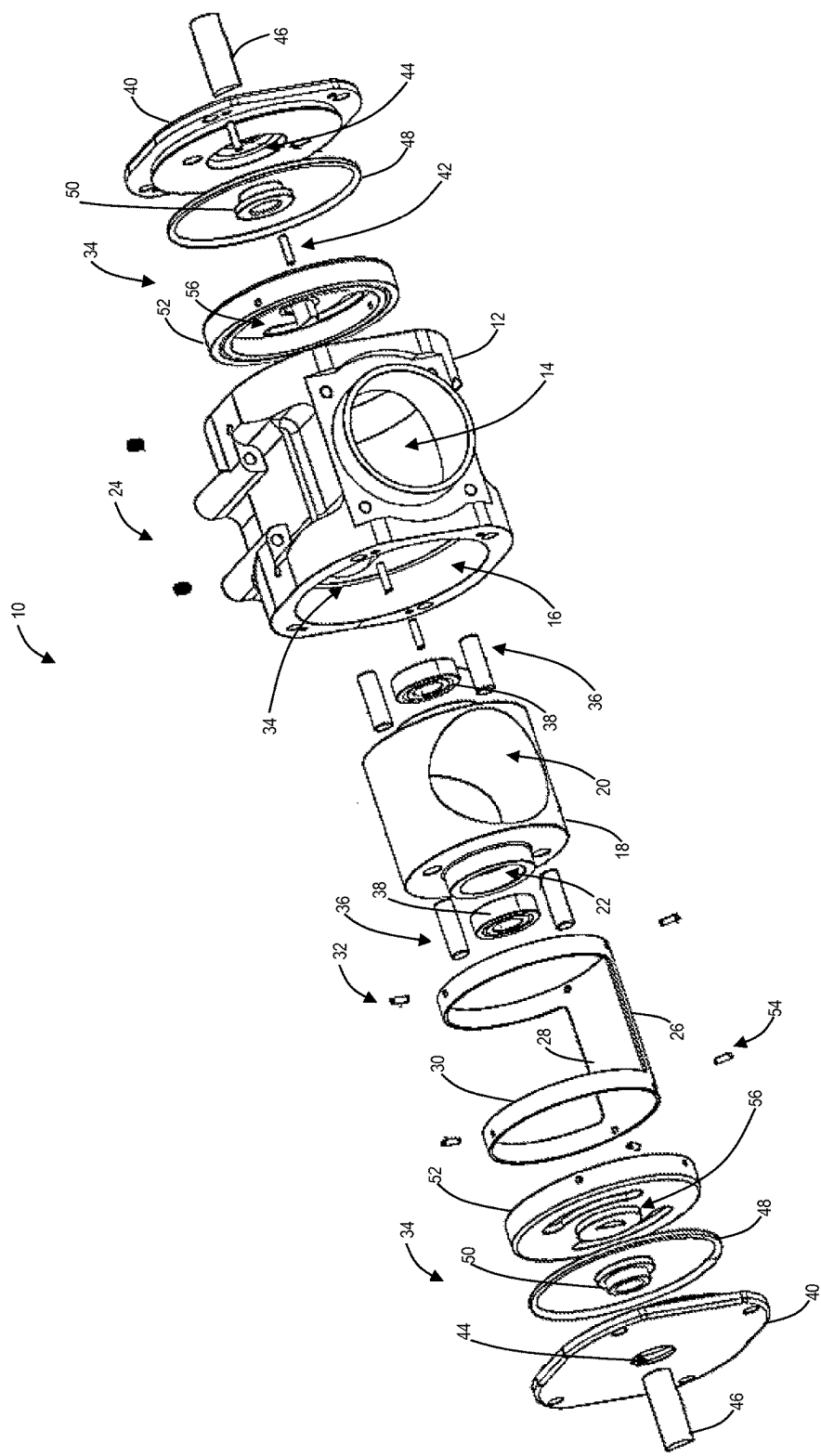
FIG. 1 is an exploded perspective view of one exemplary embodiment of the cylindrical valve assembly of the present disclosure.

Referring now specifically to FIG. 1, in one exemplary embodiment, the cylindrical valve assembly 10 includes a housing 12. The housing 12 includes a substantially cylindrical interior portion and an exterior portion that includes any desired structures for attaching the housing 12 to an external system, such as an engine or the like. The housing 12 includes a pair of first ports 14 for receiving and delivering the intake flow and a pair of second ports 16 for receiving the other components of the cylindrical valve assembly 10. A cylindrical core 18 is fixedly disposed within the housing 12. The cylindrical core 18 includes a pair of third ports 20 that coincide with the pair of first ports 14 of the housing 12, thereby communicating the intake flow through the cylindrical core 18 and the housing 12. The cylindrical core 18 also includes a pair of fourth ports 22 for receiving the other components of the cylindrical valve assembly 10. The cylindrical core 18 is secured within the housing using a plurality of dowel pins 36 or the like. A plurality of set screws 24 or the like are disposed in a plurality of manufactured holes that receive a plurality of spring pin locks 54 or the like, described in greater detail herein below, thereby providing the required environmental isolation. Advantageously, the cylindrical core 18 provides the interior of the housing 12 with a constant geometry and volume for the intake flow.

A cylindrical valve door 26 is disposed between the housing 12 and the cylindrical core 18 and is configured to rotate around the cylindrical core 18, thereby opening or closing one of the first ports 14 of the housing 12 and third ports 20 of the cylindrical core 18, thus altering the intake flow through the housing 12 and cylindrical core 18. This is the valve portion of the cylindrical valve assembly 10. In this exemplary embodiment, the cylindrical valve door 26 includes a door structure 28 and a pair of ring structures 30 that surround the cylindrical core 18. The door structure 28 is shaped and sized such that it completely obstructs the first port 14 and the third port 20 when the cylindrical valve assembly 10 is in a closed configuration. Preferably, the door structure 28 is thin, such that it provides minimal intrusion into the interior of the housing 12 and cylindrical core 18 and may be retracted between the housing 12 and cylindrical core 18. In this exemplary embodiment, the cylindrical valve door 26 is rotatably secured between the housing 12 and the cylindrical core 18 using the plurality of spring pin locks 54 that lock the cylindrical valve door 26 to rotating cylindrical covers 52 that engage a cylindrical recess 34 within the interior of the housing 12, although it is contemplated that other suitable retention structures can be used.

Figure 2:
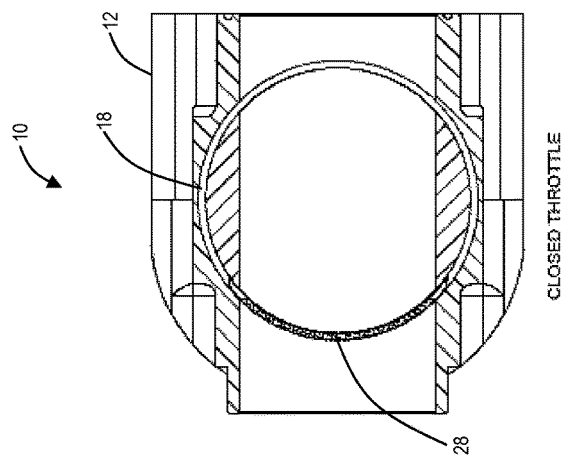
FIG. 2 is a series of cross-sectional side views of the cylindrical valve assembly of FIG. 1 in open flow (throttle), partial flow (throttle), and closed flow (throttle) configurations, illustrating the actuation of the cylindrically-conformal rotating valve door.
Figure 2:
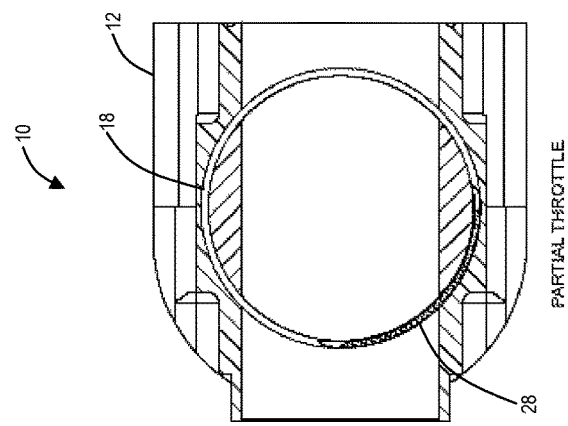
Figure 2:
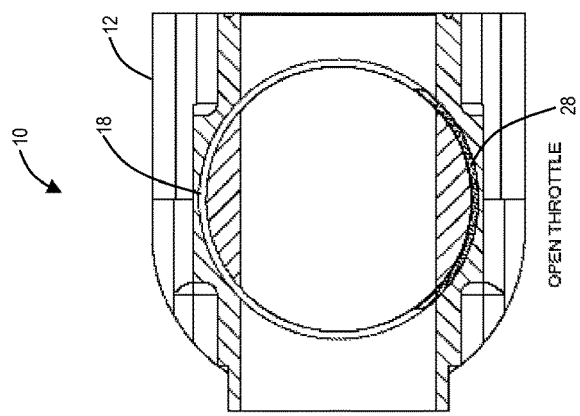

Referring now specifically to FIG. 2, in one exemplary embodiment, the relative position of the door structure 28 is illustrated between the housing 12 and cylindrical core 18 when the cylindrical valve assembly 10 is in open throttle, partial throttle, and closed throttle configurations, respectively.

Referring again specifically to FIG. 1, in one exemplary embodiment, the cylindrical valve door 26 is coupled to end assemblies 34 coupled to either end of the housing 12 and cylindrical core 18 using the plurality of dowel pins 36 and a bearing 38, although it is contemplated that other suitable retention structures can be used.

Each end assembly 34 includes an environmentally-sealed housing cover 40 that is coupled to the housing 12 using a plurality of dowel pins 42. Each housing cover 40 includes a port 44 for receiving a shaft 46 there through. Each shaft 46 passes through a sealing O-ring 48 and bushing 50 disposed between the housing covers 40 and housing 12, such that environmental isolation of the interior of the housing 12 and around the shafts 46 is ensured. Each shaft 46 is coupled to one of the rotating cylindrical covers 52 disposed within the housing 12 inside of each housing cover 40. These cylindrical covers 52 are each coupled to the cylindrical valve door 26 using the plurality of spring pin locks 54 or the like and serve to rotate the cylindrical valve door 26 within the housing 12 and about the cylindrical core 18 when the shafts 46 are rotated. In this exemplary embodiment, each cylindrical cover 52 includes a plurality of dowel pin slots 56 through which the plurality of dowel pins 36 pass, thereby coupling the cylindrical core 18 to each of the housing covers 40. In this exemplary embodiment, the interaction of these dowel pins slots 56 with the dowel pins 36 provides a predetermined limitation on the rotational motion of the cylindrical valve door 26 within the housing 12.

Figure 3:
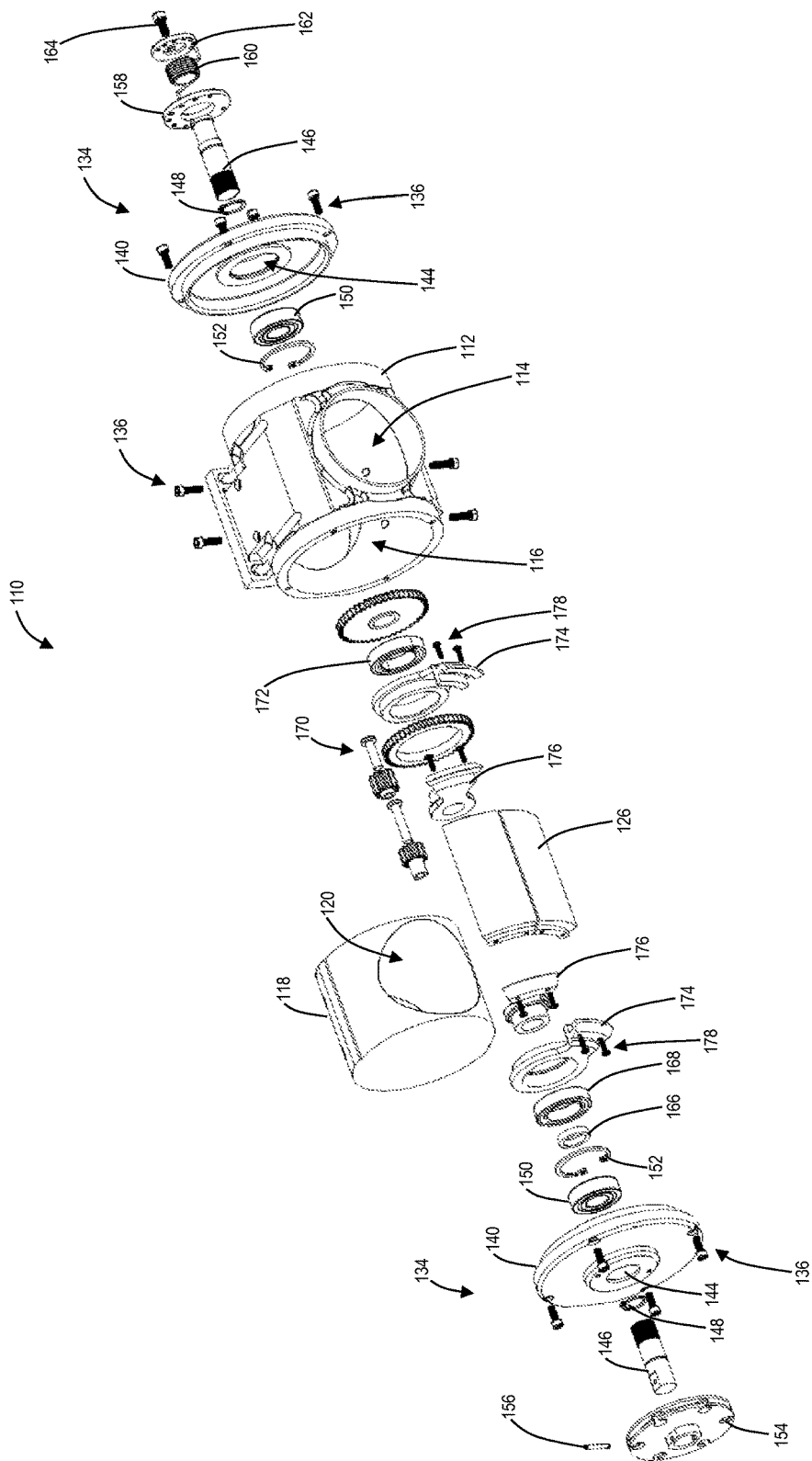
FIG. 3 is an exploded perspective view of another exemplary embodiment of the cylindrical valve assembly of the present disclosure.
Figure 4:
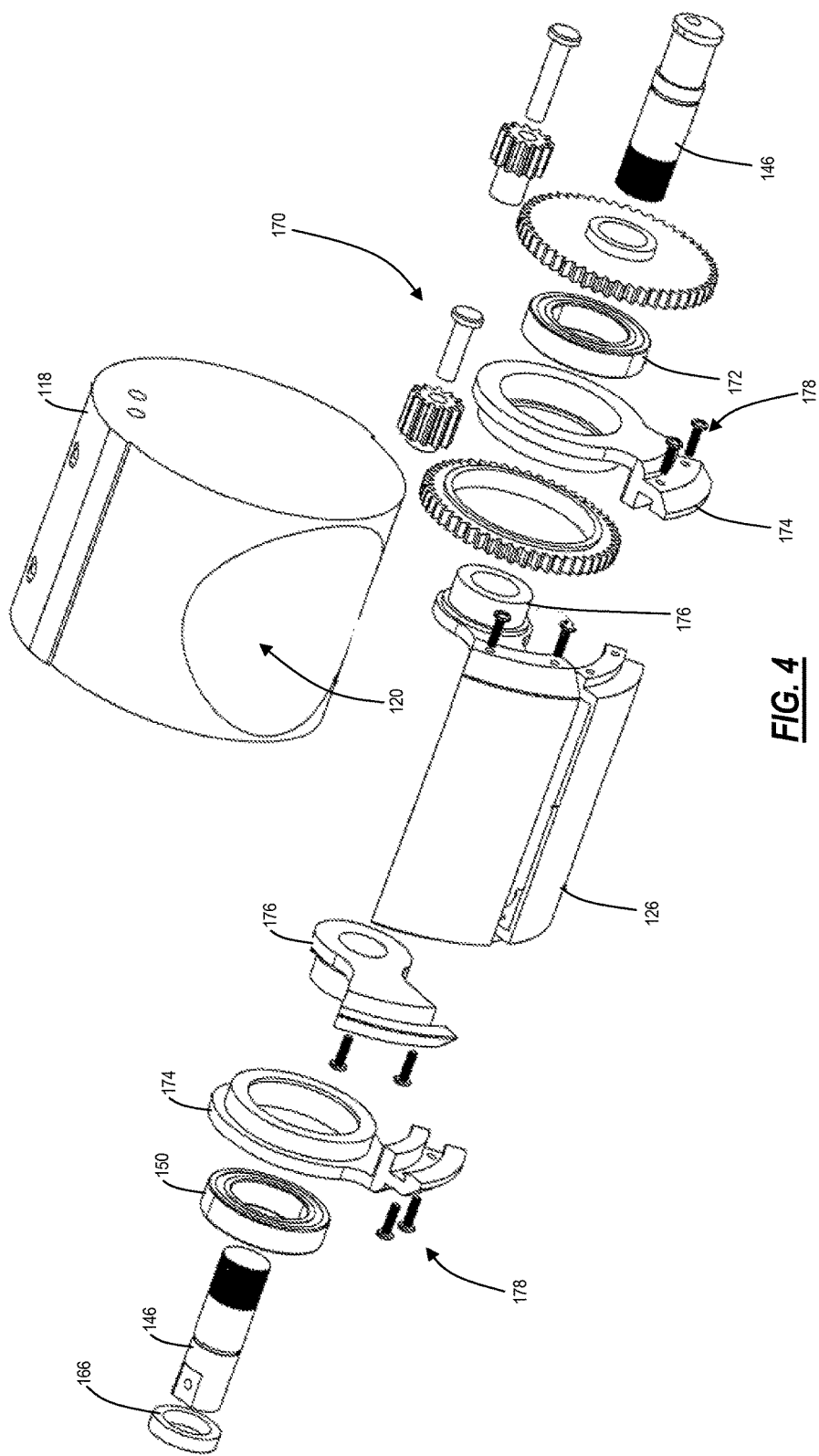
FIG. 4 is a partial exploded perspective view of the cylindrical valve assembly of FIG. 3, highlighting the door and gear assemblies.

Referring now specifically to FIG. 3, in another exemplary embodiment, the cylindrical valve assembly 110 includes a housing 112. The housing 112 includes a substantially cylindrical interior portion and an exterior portion that includes any desired structures for attaching the housing 112 to an external system, such as an engine or the like. The housing 112 includes an opposed pair of first ports 114 for receiving and delivering the intake flow and an opposed pair of second ports 116 for receiving the other components of the cylindrical valve assembly 110. Optionally, the pair of first ports 114 is offset longitudinally with respect to the housing 112, such that the housing 112 may suitably accommodate the gears disposed therein. A cylindrical core 118 is fixedly disposed within the housing 112. The cylindrical core 118 includes an opposed pair of third ports 120 that coincide with the opposed pair of first ports 114 of the housing 112, thereby communicating the intake flow through the cylindrical core 118 and the housing 112 collectively. The cylindrical core 118 is secured within the housing 112 using bolts 136 or the like. Advantageously, the cylindrical core 118 provides the interior of the housing 112 with a constant geometry and volume for the intake flow. All components of the cylindrical valve assembly 110 are manufactured from an appropriate metallic material or the like and may have any suitable dimensions, depending upon the desired application.

A pair of cylindrical valve doors 126 are disposed between the housing 112 and the cylindrical core 118 and are configured to open away from each other and close towards each other, thereby opening or closing one of the first ports 114 of the housing 112 and third ports 120 of the cylindrical core 118, thus selectively altering the intake flow through the housing 112 and cylindrical core 118. This is the valve portion of the cylindrical valve assembly 110. The door structures 126 are shaped and sized such that they completely obstruct the first port 114 and the third port 120 when the cylindrical valve assembly 110 is in a closed configuration. Preferably, the door structure 126 are relatively thin, such that they provide minimal intrusion into the interior of the housing 112 and cylindrical core 118 and may be retracted between the housing 112 and cylindrical core 118.

The cylindrical valve doors 126 are coupled to end assemblies 134 coupled to either end of the housing 112 and cylindrical core 118 using a plurality of bolts 136, although it is contemplated that other suitable retention structures can be used.

Each end assembly 134 includes an environmentally-sealed housing cover 140 that is coupled to the housing 112 using the plurality of bolts 136. Each housing cover 140 includes a port 144 for receiving a shaft 146 there through. Each shaft 146 passes through a retaining ring 148 that prevents the shaft 146 from moving longitudinally with respect to the housing 112, a double-sealed ball bearing 150 or the like that allows for free rotation of the associated shaft 146, and another retaining ring 152 that prevents the shaft 146 from moving longitudinally with respect to the housing 112. One of the shafts 146 is coupled to a throttle cable CAM or rotor 154 via a spring pin 156 or the like. The throttle cable CAM or rotor 154 receives a throttle cable (not illustrated) or the like. The other shaft 146 is coupled to a pair of spring retainers 158 and 162 and a spring 160 that actuates and closes the cylindrical valve assembly 110, the pair of spring retainers are operable for adjusting the tension of and locking the spring 160. These components are coupled to the shaft 146 by a suitable bolt 164 or the like.

The first shaft 146 described above is further disposed through a spacer washer 166 and a bearing 168. The spacer washer 166 offsets the gear assembly that is coupled to the other shaft 146, described in greater detail herein below, and the bearing 168 mounts on one of the cylinder doors 126, allowing it to move freely with respect to the other cylinder door 126. The second shaft 146 described above is further coupled to a plurality of gears 170 and disposed through a bearing 172. The plurality of gears 170 are collectively operable for opening one door 126 equal and opposite the other door 126 when one door 126 is actuated. Thus, the plurality of gears 170 translate actuation across the housing 112, causing the doors 126 to open and close in unison. It will be readily apparent to those of ordinary skill in the art that any suitable mechanism may be utilized to accomplish such purpose, gears being an exemplary means only. The bearing 172 mounts on one of the cylinder doors 126, allowing it to move freely with respect to the other cylinder door 126.

Each of the cylinder doors 126 is coupled to a pair of attachment structures 174 or 176 (via a plurality of bolts 178 or the like) that couple each cylinder door 126 to its respective shaft 146, while allowing it to move freely with respect to the other cylinder door 126. In the embodiment illustrated, these attachment structures 174 and 176 are nested structures, with one rotating freely inside the other, although other configurations could be utilized. In essence, each shaft 146 is coupled to a door 126, and the doors 126 are designed to actuate opposite one another (opening or closing together), this movement being biased by a coupling spring 160.

Again, in various exemplary embodiments, the present disclosure provides an improved cylindrical valve assembly that maintains a substantially constant internal geometry and volume upon actuation, when the shutter mechanism/valve door is opened or closed, such that the internal intake flow is substantially constant and uninterrupted.

Although the present disclosure is illustrated and described herein with reference to preferred embodiments and specific examples thereof. It will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following exemplary claims.

What is claimed is:

1. A cylindrical valve assembly, comprising:
a housing defining a fluid flow channel there through;
a cylindrical core disposed circumferentially within a conformal cylindrical void of the housing and defining a fluid flow channel there through; and
at least one cylindrical valve door disposed between the housing and the cylindrical core, wherein the at least one cylindrical valve door is coupled to one or more of the housing and the cylindrical core by a pair of opposed shafts and bearings coupled to a pair of opposed ends of the at least one cylindrical valve door;
wherein, when the at least one cylindrical valve door is actuated, the fluid flow channels through the housing and the cylindrical core are one of opened and closed;
wherein the at least one cylindrical valve door does not protrude into any portion of the interior of the cylindrical core when actuated;
wherein the housing and the cylindrical core are separate and distinct components and the cylindrical core is disposed circumferentially within the conformal cylindrical void of the housing such that the fluid flow channel defined through the cylindrical core is aligned with the fluid flow channel defined through the housing; and
wherein the housing and the cylindrical core are spaced apart around an entire circumference of the cylindrical core to accommodate the at least one cylindrical valve door, and wherein this spaced apart circumference is maintained by a plurality of bolts coupling the cylindrical core to the housing and a pair of opposed housing covers to which opposed ends of the housing are coupled allow the at least one cylindrical valve door to move freely within the spaced apart circumference.

2. The cylindrical valve assembly of claim 1, wherein the at least one cylindrical valve door comprises a pair of cylindrical valve doors.

3. The cylindrical valve assembly of claim 2, wherein the pair of cylindrical valve doors are simultaneously actuated in equal and opposite directions.

4. The cylindrical valve assembly of claim 2, wherein the pair of cylindrical valve doors are coupled via a gear assembly.

5. The cylindrical valve assembly of claim 2, wherein the pair of cylindrical valve doors are coupled to and actuated via the rotation of at least one shaft.

6. The cylindrical valve assembly of claim 2, wherein the pair of cylindrical valve doors are coupled to and actuated by a spring.

7. A throttle body, comprising:
a housing defining a fluid flow channel there through;
a cylindrical core disposed circumferentially within a conformal cylindrical void of the housing and defining a fluid flow channel there through; and
at least one cylindrical valve door disposed between the housing and the cylindrical core, wherein the at least one cylindrical valve door is coupled to one or more of the housing and the cylindrical core by a pair of opposed shafts and bearings coupled to a pair of opposed ends of the at least one cylindrical valve door;
wherein, when the at least one cylindrical valve door is actuated, the fluid flow channels through the housing and the cylindrical core are one of opened and closed;

wherein the at least one cylindrical valve door does not protrude into any portion of the interior of the cylindrical core when actuated;

wherein the housing and the cylindrical core are separate and distinct components and the cylindrical core is disposed circumferentially within the conformal cylindrical void of the housing such that the fluid flow channel defined through the cylindrical core is aligned with the fluid flow channel defined through the housing; and wherein the housing and the cylindrical core are spaced apart around an entire circumference of the cylindrical core to accommodate the at least one cylindrical valve door, and wherein this spaced apart circumference is maintained by a plurality of bolts coupling the cylindrical core to the housing and a pair of opposed housing covers to which opposed ends of the housing are coupled allow the at least one cylindrical valve door to move freely within the spaced apart circumference.

8. The throttle body of claim 7, wherein the at least one cylindrical valve door comprises a pair of cylindrical valve doors.

9. The throttle body of claim 8, wherein the pair of cylindrical valve doors are simultaneously actuated in equal and opposite directions.

10. The throttle body of claim 8, wherein the pair of cylindrical valve doors are coupled via a gear assembly.

11. The throttle body of claim 8, wherein the pair of cylindrical valve doors are coupled to and actuated via the rotation of at least one shaft.

12. The throttle body of claim 8, wherein the pair of cylindrical valve doors are coupled to and actuated by a spring.

13. A cylindrical valve assembly, comprising:
a housing defining a fluid flow channel there through;
a cylindrical core disposed circumferentially within a conformal cylindrical void of the housing and defining a fluid flow channel there through; and
at least one cylindrical valve door disposed between the housing and the cylindrical core, wherein the at least one cylindrical valve door is coupled to one or more of the housing and the cylindrical core by a pair of opposed shafts and bearings coupled to a pair of opposed ends of the at least one cylindrical valve door;

wherein, when the at least one cylindrical valve door is actuated, the fluid flow channels through the housing and the cylindrical core are one of opened and closed;

wherein the at least one cylindrical valve door does not protrude into any portion of the interior of the cylindrical core when actuated;

wherein the housing and the cylindrical core are separate and distinct components and the cylindrical core is disposed circumferentially within the conformal cylindrical void of the housing such that the fluid flow channel defined through the cylindrical core is aligned with the fluid flow channel defined through the housing; and wherein the housing and the cylindrical core are spaced apart around a partial circumference of the cylindrical core to accommodate the at least one cylindrical valve door and in direct contact around a partial circumference of the cylindrical core to limit actuation of the at least one cylindrical valve door, and wherein this spaced apart partial circumference is maintained by a plurality of bolts coupling the cylindrical core to the housing and a pair of opposed housing covers to which opposed ends of the housing are coupled allow the at least one cylindrical valve door to move freely within the spaced apart partial circumference.

* * * * *